United States Patent
Kohn et al.

(10) Patent No.: US 10,051,292 B1
(45) Date of Patent: *Aug. 14, 2018

(54) TREE-CODED VIDEO COMPRESSION WITH COUPLED PIPELINES

(71) Applicant: Ambarella, Inc., Santa Clara, CA (US)

(72) Inventors: Leslie D. Kohn, Saratoga, CA (US); Ellen M. Lee, Saratoga, CA (US); Peter Verplaetse, Redwood City, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,072

(22) Filed: Jan. 30, 2017

Related U.S. Application Data

(63) Continuation of application No. 14/048,307, filed on Oct. 8, 2013, now Pat. No. 9,596,470.

(60) Provisional application No. 61/883,402, filed on Sep. 27, 2013.

(51) Int. Cl.
*H04N 7/12* (2006.01)
*H04N 19/96* (2014.01)
*H04N 19/25* (2014.01)

(52) U.S. Cl.
CPC ............ *H04N 19/96* (2014.11); *H04N 19/25* (2014.11)

(58) Field of Classification Search
CPC ... H04N 19/00969; H04N 19/96; H04N 19/25
USPC .................................................. 375/240.01
See application file for complete search history.

(56) References Cited

U.S. PATENT DOCUMENTS

| | | | |
|---|---|---|---|
| 2002/0166008 A1 | 11/2002 | Tanaka et al. | 710/56 |
| 2004/0022446 A1 | 2/2004 | Taubman | 382/240 |
| 2006/0239343 A1 | 10/2006 | Nader | 375/240.01 |
| 2007/0286288 A1 | 12/2007 | Smith et al. | 375/240.24 |
| 2010/0020877 A1 | 1/2010 | Au et al. | 375/240.16 |
| 2011/0320719 A1 | 12/2011 | Mejdrich et al. | 711/120 |
| 2013/0083843 A1 | 4/2013 | Bennett | 375/240.02 |
| 2013/0114736 A1 | 5/2013 | Wang et al. | 375/240.24 |
| 2013/0188708 A1 | 7/2013 | Rusert et al. | 375/240.12 |
| 2014/0015922 A1 | 1/2014 | Zhang | 348/43 |
| 2014/0072040 A1 | 3/2014 | Mathew et al. | 375/240.13 |
| 2014/0241439 A1 | 8/2014 | Samuelsson et al. | 375/240.26 |

FOREIGN PATENT DOCUMENTS

| | | | | |
|---|---|---|---|---|
| WO | WO2012045319 A1 | 4/2012 | | H04N 7/26 |
| WO | WO2013107906 A2 | 7/2013 | | H04N 7/26 |
| WO | WO2014003675 A1 | 1/2014 | | H04N 7/26 |

*Primary Examiner* — Zhihan Zhou
(74) *Attorney, Agent, or Firm* — Christopher P. Maiorana, PC

(57) ABSTRACT

An apparatus includes a circuit and a processor. The circuit may be configured to (i) generate a plurality of sets of coefficients by compressing a tile in a picture in a video signal at each of a plurality of different sizes of a plurality of coding units in a coding tree unit and (ii) reconstruct the tile based on a particular one of the sets of coefficients. The sets of coefficients may be generated at two or more of the different sizes of the coding units in parallel. Each of the sets of coefficients may be generated in a corresponding one of a plurality of pipelines that operate in parallel. Each of the sets of coefficients may have a same number of the coefficients. The processor may be configured to select the particular set of coefficients in response to the compression of the tile.

20 Claims, 9 Drawing Sheets

TREE-CODED VIDEO COMPRESSION WITH COUPLED PIPELINES

This application relates to U.S. Ser. No. 14/048,307, filed Oct. 8, 2013, which relates to U.S. Provisional Application No. 61/883,402, filed Sep. 27, 2013, which relates to co-pending U.S. application Ser. No. 13/935,424, filed Jul. 3, 2013, each of which are hereby incorporated by reference in their entirety.

FIELD OF THE INVENTION

The present invention relates to video encoding generally and, more particularly, to tree-coded video compression with coupled pipelines.

BACKGROUND OF THE INVENTION

Conventional video coding standards divide each picture into a sequence of basic units that are processed sequentially, due to dependencies between neighboring basic units, to achieve good quality video coding. In older standards such as MPEG-1, MPEG-2 and MPEG-4 Advanced Video Coding, the basic unit is a macroblock of 16×16 pixels. A corresponding basic unit for tree-coded video compression is a coding tree unit. The coding tree unit is further divided using K-tree partitioning into variable size coding units with sizes of 8×8, 16×16, 32×32 or 64×64 pixels. For a high-efficiency video coding recommendation (i.e., an International Telecommunication Union-Telecommunications Recommendation H.265), the parameter K=4, meaning that the coding tree units can be divided using quad-tree partitioning.

Depending on the content, different coding unit sizes within a coding tree unit lead to better quality. Therefore, all combinations of coding unit sizes are explored to find the tree partitioning that yields a best quality video coding. The exploring increases the coding complexity by a factor of four. Some conventional encoders use multiple processing devices operating in parallel to explore the mode decisions for the coding units of different sizes. However, because the coding units of different sizes can be mixed within a coding tree unit, and because of dependencies that exist between coding units and the neighboring coding units (both within a coding tree unit and between neighboring coding tree units), the multiple processing devices are tightly coupled.

It would be desirable to implement tree-coded video compression with coupled pipelines.

SUMMARY OF THE INVENTION

The present invention concerns an apparatus including a circuit and a processor. The circuit may be configured to (i) generate a plurality of sets of coefficients by compressing a tile in a picture in a video signal at each of a plurality of different sizes of a plurality of coding units in a coding tree unit and (ii) reconstruct the tile based on a particular one of the sets of coefficients. The sets of coefficients may be generated at two or more of the different sizes of the coding units in parallel. Each of the sets of coefficients may be generated in a corresponding one of a plurality of pipelines that operate in parallel. Each of the sets of coefficients may have a same number of the coefficients. The processor may be configured to select the particular set of coefficients in response to the compression of the tile.

The objects, features and advantages of the present invention include providing tree-coded video compression with coupled pipelines that may (i) implement interleaved pipelines, (ii) couple the pipelines, (iii) utilize minimal hardware area, (iv) maintain near 100 percent utilization of the pipelines and/or (v) be implemented in one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Some embodiments of the present invention may achieve high performance, high quality tree-coded video compression according to more recent video compression standards including, but not limited to a high-efficiency video coding (e.g., HEVC) standard (e.g., an International Telecommunication Union-Telecommunications Recommendation H.265). Tree coding generally allows coding into basic units of variable sizes. To achieve high quality encoding, all size options may be explored in parallel. The exploration may be achieved by parallel processing devices or single processing device that process blocks of different size in time-multiplexed fashion.

Figure 1:
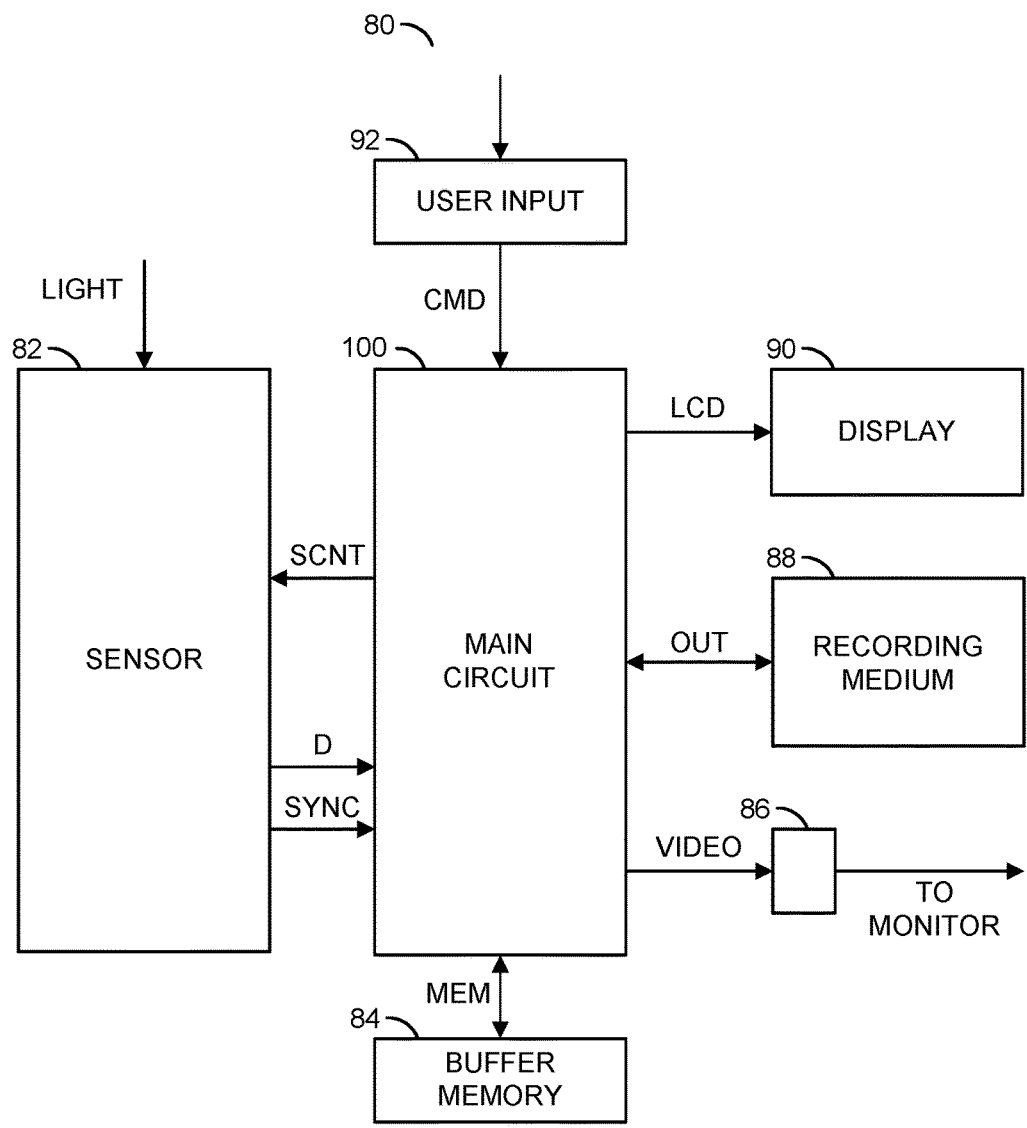
FIG. 1 is a block diagram of an apparatus.

Referring to FIG. 1, a block diagram of an example implementation of an apparatus 80 is shown. The apparatus (or system) 80 generally comprises a circuit (or module) 82, a circuit (or module) 84, a circuit (or port) 86, a circuit (or module) 88, a circuit (or module) 90, a circuit (or module) 92, and a circuit (or module) 100. The circuits 82 to 100 may be implemented in hardware, software, firmware or any combination thereof in an apparatus (or device). In some embodiments, the apparatus 100 may be a digital video camera, a digital still camera or a hybrid digital video/still camera. In other embodiments, the apparatus 100 may implement a broadcast encoder (e.g., just the circuits 84 and 100).

An optical signal (e.g., LIGHT) may be received by the circuit 82. The circuit 82 may generate and present a digital signal (e.g., D) to the circuit 100. The signal D generally conveys one or more images (or pictures) in a digital format. A synchronization signal (e.g., SYNC) may also be generated by the circuit 82 and received by the circuit 100. The signal SYNC may carry synchronization information for the images and/or pixels within the images. A sensor control signal (e.g., SCNT) may be generated and presented from the circuit 100 to the circuit 82. The signal SCNT generally carries control information used to configure the sensor. A signal (e.g., OUT) may be exchanged between the circuit 100 and the circuit 88. The signal OUT may contain compressed and encoded video. The circuit 100 may generate and present a signal (e.g., VIDEO) through the interface 86 to a monitor outside the apparatus 80. The signal VIDEO may contain uncompressed video. A signal (e.g., LCD) may be generated by the circuit 100 and presented to the circuit 90. The signal LCD generally carries video information suitable to drive a built-in display. A command signal (e.g., CMD) may be generated by the circuit 92 and presented to the circuit 100. The signal CMD generally conveys commands from a user to operate the apparatus 80. A signal (e.g., MEM) may be exchanged between the circuit 100 and the circuit 84. The signal MEM exchanges data between the circuits 84 and 100.

The circuit 82 may implement an electro-optical sensor circuit. The circuit 82 is generally operational to convert the optical image received in the signal LIGHT into the signal D based on parameters received in the signal SCNT. The signal D may convey the one or more optical images as one or more digital images (e.g., fields, frames, pictures). The signal SYNC generally conveys synchronization information related to the images and the pixels within. The signal SCNT may carry windowing, binning, read rate, offset, scaling, color correction and other configuration information for use by the circuit 82. The images may be generated having an initial resolution and an initial color space (e.g., a Bayer color space in which each pixel may be represented by multiple color samples) at an initial data rate. In some embodiments, the circuit 82 may include an image pipeline or other image source that supplies source images in the signal D.

The circuit 82 may include an electronic cropping (or windowing) capability. The electronic cropping capability may be operational to limit readout of image elements in a window (or an active area). Processing of the electronic images in the circuit may include, but is not limited to, analog gain for color corrections and analog offset adjustments for black level calibrations. The conversion generally comprises an analog to digital conversion (e.g., 10-bit).

The circuit 84 may implement a buffer memory. The circuit 84 is generally operational to store image data temporarily (e.g., luminance and chrominance) for the circuit 100. In some embodiments, the circuit 84 may be fabricated as one or more dies separate from the circuit 100 fabrication. In other embodiments, the circuit 84 may be fabricated in (on) the same die as the circuit 100. The circuit 84 may implement a double data rate (e.g., DDR) synchronous dynamic random access memory (e.g., SDRAM). Other memory technologies may be implemented to meet the criteria of a particular application.

The circuit 86 may implement a connector. The circuit 86 is generally configured to allow the apparatus 80 to be connected to a television or computer monitor. Formats for the circuit 86 may include, but are not limited to, a component interface, s-video interface, a high-definition multimedia interface (e.g., HDMI) and the like.

The circuit 88 may implement a recording medium. The medium 88 generally comprises one or more nonvolatile memory devices capable of storing the signal OUT. In some embodiments, the recording medium 88 may comprise a single memory medium. For example, the recording medium 88 may be implemented as a FLASH memory or a micro hard disk drive (also known as a "1-inch" hard drive). The memory may be sized (e.g., 4 gigabyte FLASH, 12 gigabyte hard disk drive). In some embodiments, the recording medium 88 may be implemented as multiple media. For example, a FLASH memory may be implemented, a tape medium or an optical medium may be implemented for recording the signal OUT. Other types of media may be implemented to meet the criteria of a particular application.

The circuit 90 may implement a local display of the camera/camcorder. The circuit 90 may be operational to display the still images and/or video received through the signal LCD. The still images/video may be lower-resolution versions of the images in the signal D. In some embodiments, the circuit 90 may implement a color or black-and-white liquid crystal display. Other display technologies may be implemented to meet the criteria of a particular application.

The circuit 92 may implement a user input circuit. The circuit 92 may be operational to generate the signal CMD based on commands received from a user. The commands received may include, but are not limited to, a take still picture command, a start recording command, a stop recording command, a zoom in command and a zoom out command. In some embodiments, the signal CMD may comprise multiple discrete signals (e.g., one signal for each switch implemented in the user input circuit 92). In other embodiments, the signal CMD may carry the user entered commands in a multiplexed fashion as one or a few signals.

The circuit 100 may implement a main processing circuit. The circuit 100 is generally operational to generate the signals OUT, VIDEO and LCD by processing the images received in the signal D. The circuit 100 may be operational to generate the signal SCNT based on the user selections received through the signal CMD. The circuit 100 may load and store data to the circuit 84 through the signal MEM. The signal OUT generally comprises a still image (e.g., JPEG) and/or a sequence of images (or pictures) configured as a compressed/encoded video signal (e.g., H.265). The signal VIDEO generally comprises a video signal (e.g., ITU-R BT.601, ITU-R BT.709, ITU-R BT.656-4, H.264/AVC, MPEG-2 or MPEG-4). Other standard and/or proprietary still picture and/or video compression standards may be implemented to meet the criteria of a particular application.

The circuit 100 is generally operational to (i) generate a plurality of sets of coefficients by compressing a block in a picture in the signal IN at a plurality of different sizes of coding units in a coding tree unit, (ii) generate an output signal by entropy encoding a particular set of coefficients and (iii) select the particular set of coefficients in response to the compressing. Each set of coefficients may be generated in a corresponding one of a plurality of pipelines that operate in parallel. Further processing of the images by the circuit 100 may include, but is not limited to, decimation filtering, interpolation, formatting, color space conversions, color corrections, tone corrections, gain corrections, offset corrections, black level calibrations, white balancing, image sharpening, image smoothing, up conversions, down conversions, filtering and the like. In various embodiments, the processing may be implemented in whole or in part by software running in the circuit 100. In some embodiments, the circuit 82 and the circuit 100 may be fabricated in (on) separate dies. In other embodiments, the circuit 82 and the circuit 100 may be fabricated in (on) the same die.

Figure 2:
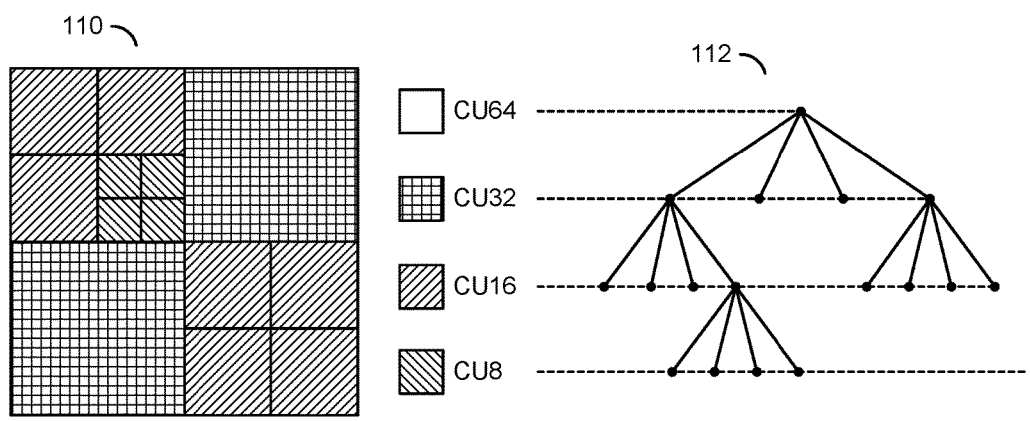
FIG. 2 is a diagram of tree partitioning of a coding tree unit into smaller coding units with quad-partitioning.

Referring to FIG. 2, a diagram of an example tree partitioning of a coding tree unit into smaller coding units with quad-partitioning is shown. Tree-coded video compression generally involves encoding the images in units of variable size. A coding tree unit (e.g., CTU) 110 with fixed size of 16×16, 32×32 or 64×64 pixels (or samples) for the entire sequence can be recursively partitioned 112 into smaller coding units (e.g., CU). Therefore the coding units may be of variable size, and range from a maximum size of 64×64 (e.g., CU64) pixels (or samples) down to a smallest size of 8×8 (e.g., CU8) pixels (or samples). The coding tree unit and the coding unit sizes shown are generally specified in the H.265 high-efficiency video coding recommendation. Other sizes may be implemented to meet the criteria of a particular application.

Different content may result in different choices for the tree partitioning of a coding tree unit into the coding units. The decisions are generally made in hardware, or software and/or firmware executing in a processor, and best results may be achieved by exploring all possible partitions in parallel and comparing using cost metrics such as a sum of absolute transformed differences (e.g., SATD).

Coding units may be evaluated using an N-stage interleaved pipelines in the circuit 100. The pipelines may process coding units from N different tiles in parallel in a tile-interleaved fashion. Consider two adjacent coding unit sizes in a quad-tree partitioning (e.g., K=4). The coding units of a size 2M×2M (reference number 122) and a size M×M (reference number 124) may each be evaluated within a dedicated pipeline. A number of stages (e.g., P) could be shared between the two pipelines, and the remaining (e.g., Q=N−P) stages may be separate, since the remaining Q stages generally operate at different rates from each other in the various pipelines. For example, a pipeline that processes the coding units 124 of a size M×M may operate at four times a faster rate (e.g., ¼ the number of clock cycles) than a pipeline that processes the coding units 122 of a size 2M×2M. Because the coding units 124 of the size M×M may be four times smaller than the coding units 122 of the size 2M×2M, the two pipelines may have similar hardware areas.

Because of the dependencies of the neighboring blocks (which may be of any size), the Q stages of both pipelines should start and finish processing the collocated coding units at approximately the same time. The stages (e.g., ST0-ST2) of the higher-rate pipeline (operating on the smaller coding unit size) generally advance every time unit. Therefore, a new block is started every Q time units. The lower-rate pipeline (operating on the larger coding unit size) generally advances every R time units. Therefore, a block may be completed after R×Q time units. Because of the K-tree partitioning (or tree branching factor), K collocated blocks of the smaller coding unit size exist in a single block of the larger coding unit size. Therefore, the lower-rate pipeline generally takes K×Q time units to process all collocated coding units. If both pipelines start operating the collocated blocks at the same time, both pipelines may also finish at approximately the same time if R×Q=K×Q (e.g., if a speed ratio R of both pipelines matches the multiplicity K of the tree nodes).

To keep the pipelines 100% utilized, both pipelines may operate on Q active tiles in a tile-interleaved fashion. The lower-rate pipeline (operating on the larger coding unit size) generally starts processing a new tile every R=K time units. However, the higher-rate pipeline starts a new block of the same tile every Q time units. Unless K and Q are relative prime numbers, conflicts may occur for the higher-rate pipeline. The conflicts may arise because the higher-rate pipeline may have to start a block of a new tile to keep the pipeline 100% utilized while, at the same time, the higher-rate pipeline may also have to start a block of the original tile to keep up with the lower-rate pipeline. For K=4 (e.g., quad-tree partitioning) the criterion that K and Q are relative prime numbers generally implies that Q is an odd number. Additional detail regarding the interleaved video coding pipeline may be found in co-pending U.S. application Ser. No. 13/935,424, filed Jul. 3, 2013, which is hereby incorporated by reference in its entirety.

Figure 3:
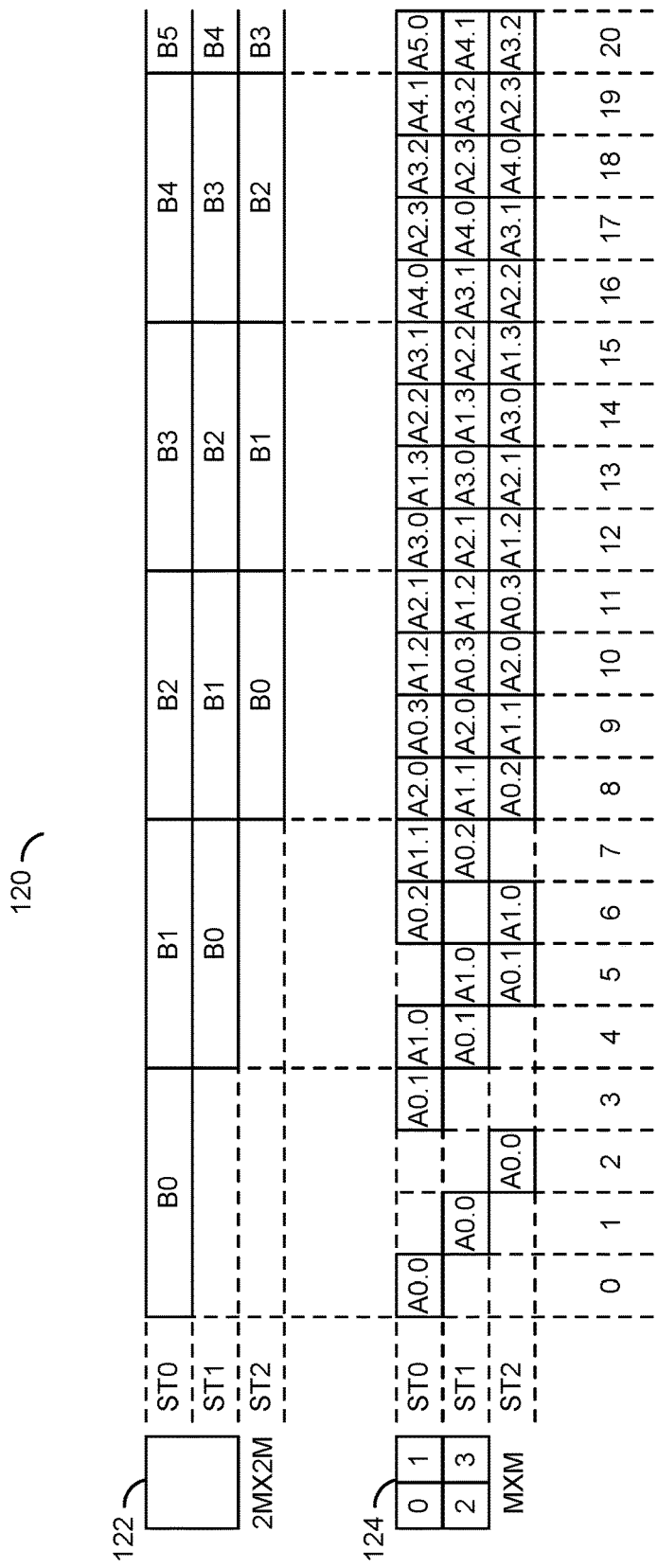
FIG. 3 is a diagram of two parallel coupled pipelines.

Referring to FIG. 3, a diagram of two parallel coupled pipelines is shown. Each pipeline may have multiple (e.g., Q=3) unique stages. Both pipelines in the example are shown operating on three different tiles (e.g., a tile 0, a tile 1 and a tile 2) in tile-interleaved fashion.

At time 0, an M×M block A0.0 of the tile 0 may enter an initial stage (e.g., ST0) of a pipeline (e.g., the lower pipeline M×M). At the same time, a block B0 of the tile 0 of a size 2M×2M may enter the initial stage ST0 of another pipeline (e.g., the upper pipeline 2M×2M). The stages of the pipeline M×M generally advances every time step (or cycle). Therefore, after three time steps, the block A0.0 is completely evaluated. At the time 3, a neighboring block A0.1 of the tile 0 may be started in stage ST0.

After 12 times steps, all four M×M-sized blocks A0.0-A0.3 of the tile 0 may have been evaluated in a sequential fashion. Since the stages of the pipeline 2M×2M advance every four time steps, 12 time steps may be used by the pipeline 2M×2M to complete an evaluation of the block B0. At the end of the 12th time step (e.g., an end of step 11) a choice may be made for the block between the partition sizes of A0.0-A0.3 (e.g., M×M size) or B0 (e.g., 2M×2M size). Afterwards, both pipelines may be ready to start processing neighboring blocks: A3.0 for the pipeline M×M, and B3 for the pipeline 2M×2M.

To keep the pipelines 100% utilized, blocks from three different tiles may be processed in parallel. Thus at time 4, when the block B0 of the tile 1 advances to the stage ST1 in the pipeline 2M×2M, a new 2M×2M block B1 may be started in the stage ST0. At the same time, the collocated top-left M×M block A1.0 of the tile 1 may be started in the stage ST0 of the pipeline M×M.

Similarly at time 8, a block B2 of the tile 2 is generally started in pipeline 2M×2M, while at the same time a block A2.0 of the tile 2 may be started in pipeline M×M. Continuing forward, both pipelines are approximately 100% utilized as each pipeline operates on three different tiles in tile-interleaved fashion.

The collocated blocks of the same tile are generally started in both pipelines at the same time. Because of the fixed speed ratio between the pipelines, both pipelines may also finish processing the collocated blocks at the same time. Due to the odd number of stages in both pipelines, a free slot in the stage ST0 of the pipeline M×M should exist at the same time when the stage ST0 frees up in the pipeline 2M×2M.

Figure 4:
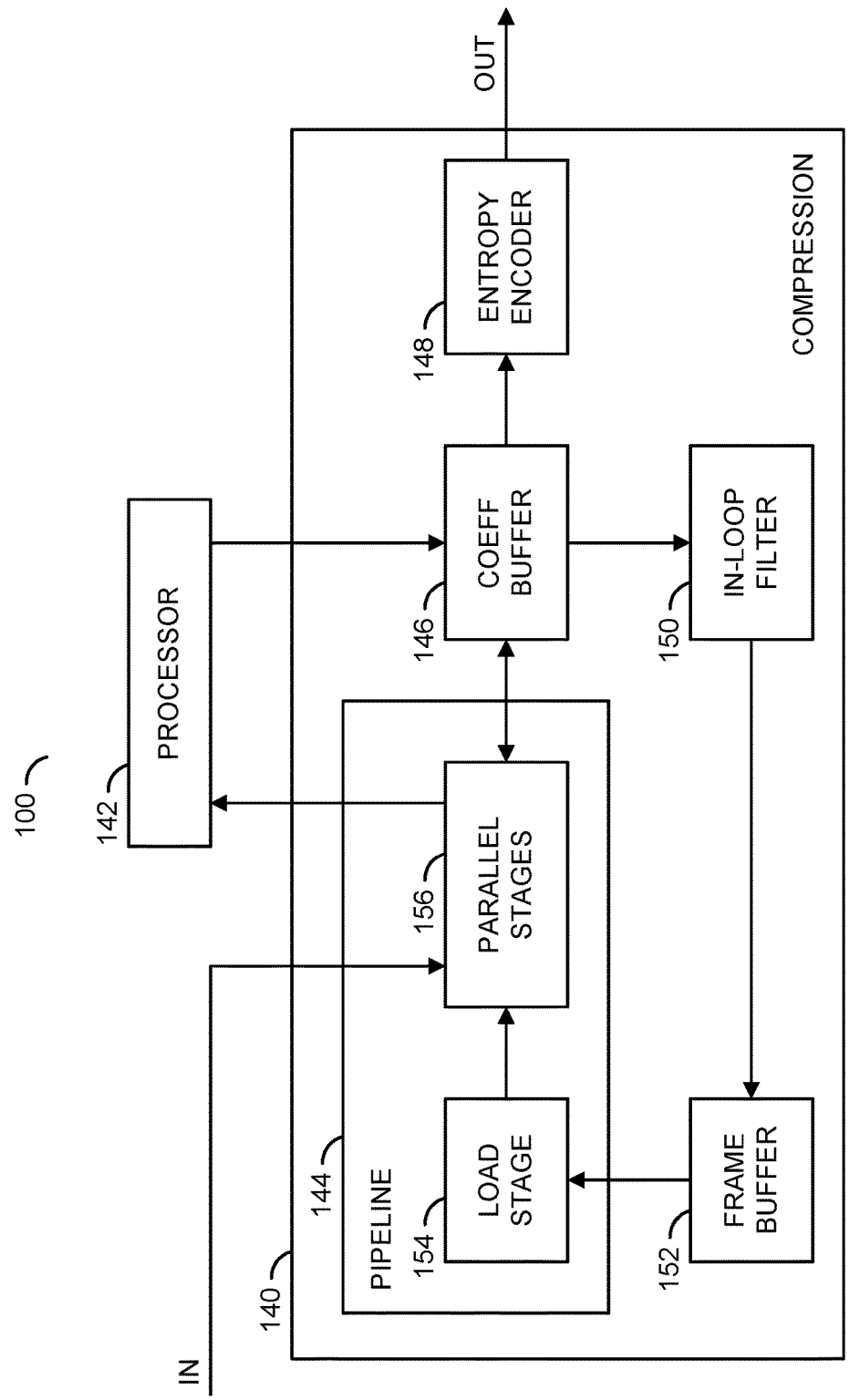
FIG. 4 is a diagram of a portion of a circuit in the apparatus.

Referring to FIG. 4, a diagram of an example implementation of a portion of the circuit 100 is shown in accordance with a preferred embodiment of the present invention. The circuit 100 generally comprises a block (or circuit) 140 and a block (or circuit) 142. The circuit 140 generally comprises a block (or circuit) 144, a block (or circuit) 146, a block (or circuit) 148, a block (or circuit) 150, and a block (or circuit) 152. The circuit 144 may comprise a block (or circuit) 154 and a block (or circuit) 156. The circuits 140-156 may be implemented in hardware, software, firmware or any combination thereof in an apparatus (or device). The signal IN may be received by the circuit 156. The signal OUT may be generated and presented by the circuit 148.

The circuit 140 is shown implementing a compression circuit. The circuit 140 is generally operational to compress and encode the images received in the signal IN to generate encoded and compressed video in the signal OUT. The compression generally involves (i) generating a plurality of sets of coefficients by compressing a block in a picture in the signal IN at a plurality of different sizes of coding units in a coding tree unit and (ii) generating an output signal by entropy encoding a particular set of coefficients. Each set of coefficients may be generated in a corresponding one of the pipelines that operate in parallel. The encoding may be an entropy encoding.

The circuit 142 is shown implementing a processor circuit. The circuit 142 is generally operational to evaluate the coefficient sets and select the particular set of coefficients in response to the compressing. The circuit 142 subsequently commands the circuit 146 to send the particular coefficient set to the circuit 148 for entropy encoding and to the circuit 150 for filtering.

The circuit 144 is shown implementing a pipeline circuit. The circuit 144 is operational to generate coefficients by compressing the images received in the signal IN. In some embodiments of the invention, the circuit 144 may implement a multistage (e.g., 4-stage) hardware pipeline (e.g., N=4) used to process the coding units. The stages may include, but are not limited to, a load (e.g., LD) stage, a motion estimation (e.g., ME) stage, a mode decision (e.g., MD) stage, and a transform (e.g., XF) stage.

The load stage generally performs reference image fetching and stores the pixels in a local reference buffer. The motion estimation stage may perform motion estimations for inter-prediction candidates. The mode decision stage generally performs inter sample prediction and intra sample prediction and subsequently selects a coding mode. The transform stage may provide a forward path to feed into an entropy coding unit, and an inverse path to produce neighboring sample data that are fed into an in-loop filter unit.

The circuit 146 is shown implementing a coefficient buffer circuit. The circuit 146 is generally operational to temporarily store the coefficients created by the circuit 144 while compressing the images in the signal IN. The coefficients may be routed from the circuit 146 to the circuits 148 and 150 under the control of the circuit 142. In some embodiments, the circuit 146 is internal to the circuit 100. In other embodiments, the circuit 146 is a part of the circuit 84.

The circuit 148 is shown implementing an entropy encoder. In some embodiments, the entropy encoding technique may be a context-adaptive binary arithmetic coding technique. Other entropy coding techniques may be implemented to meet the criteria of a particular application.

The circuit 150 is shown implementing an in-loop filter. The circuit 150 is generally operational to filter the blocks created by the circuit 144 to smooth rough edges.

The circuit 152 is shown implementing a frame buffer circuit. The circuit 152 may be operational to buffer reconstructed reference frames (or images) subsequently used by the circuit 140 to compress additional images received in the signal IN.

The circuit 154 is shown implementing a load stage circuit. The circuit 154 may be a single stage that is common to the multiple pipelines of the circuit 144.

The circuit 156 is shown implementing multiple parallel stage circuits. The circuit 156 may be configured as multiple pipelines operating in parallel. Each pipeline may receive the same image data via the signal IN. Each pipeline may receive the same reference pictures from the circuit 154. In some embodiments, each parallel pipeline may include, but is not limited to, the motion estimation stage, the mode decision stage, and the transform stage. Coefficient sets created by each parallel pipeline are generally buffered in the circuit 146 while the circuit 142 decides which set of coefficients is the best set to entropy encode and present in the signal OUT.

Figure 5:
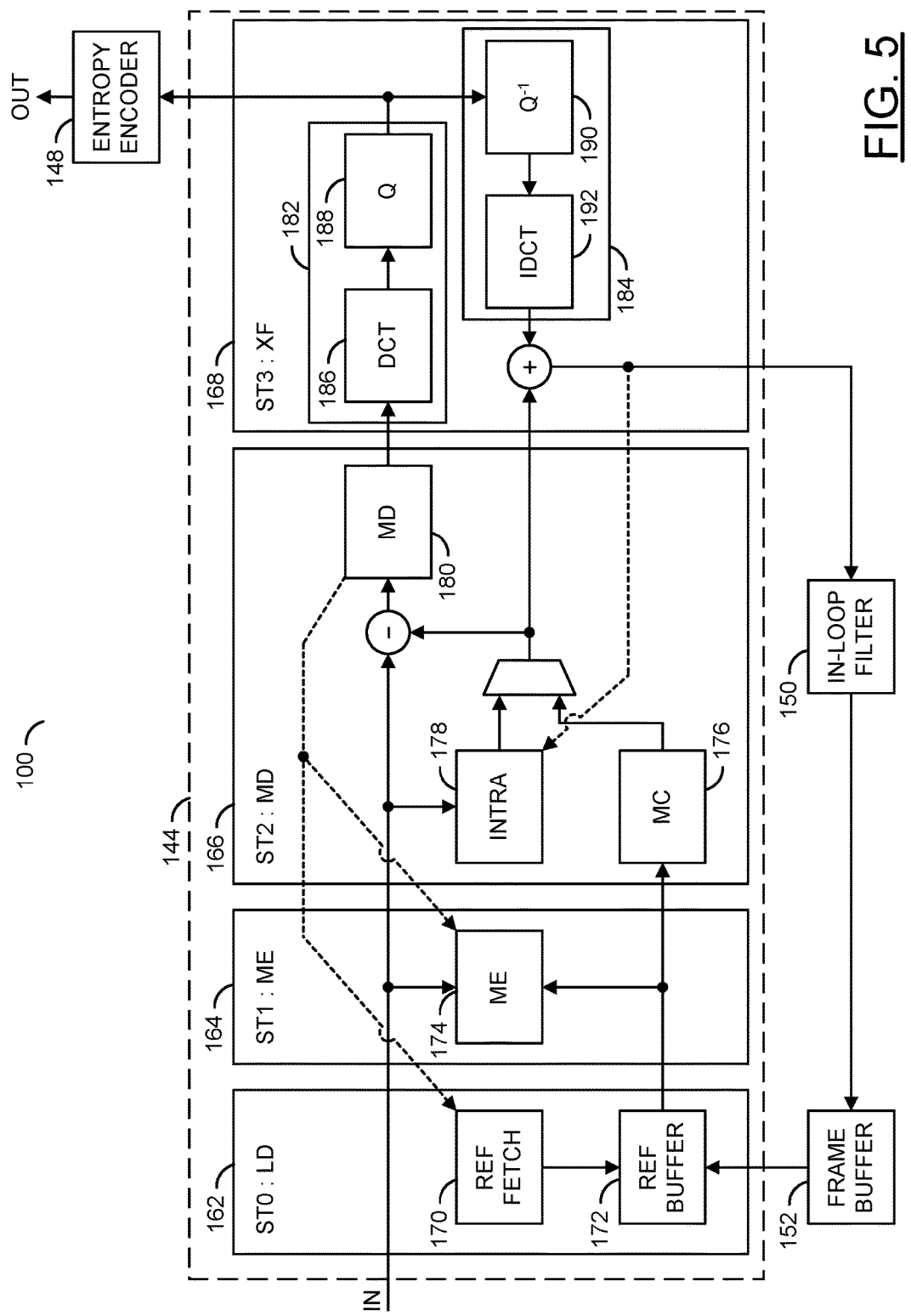
FIG. 5 is a diagram of a four-stage pipeline.

Referring to FIG. 5, a diagram of the circuit 100 with an example implementation of a four-stage circuit 144 is shown. The circuit 144 may comprise a stage (or block) 162, a stage (or block) 164, a stage (or block) 166, and a stage (or block) 168. Other numbers of stages may be implemented by other embodiments to meet the design criteria of a particular implementation.

The stage 162 is shown implementing a load stage (e.g., the stage 154 in FIG. 4). The stage 162 generally comprises a reference fetch unit 170 and a buffer (memory) 172. The reference fetch unit 170 may be configured to fetch only a portion of a full reference frame used by the circuit 144. The buffer 172 may be configured to allow fast access to fetched reference samples (e.g., luminance samples) by the other stages of the circuit 144.

The stage 164 is shown implementing a motion estimation state. The stage 164 generally comprises a motion estimation unit 174. The motion estimation unit 174 may be operational to detect motion of a current block being compressed and a reference image buffered in the circuit 152.

The stage 166 is shown implementing a mode decision stage. The stage 166 generally comprises an inter prediction sample generation unit 176, an intra prediction unit 178, and a candidate selection unit 180. The stage 166 may be operational to determine a mode (e.g., intra mode or inter mode) for compressing the current samples.

The stage 168 is shown implementing a transform stage. The stage 168 generally comprises a forward path unit 182 and an inverse path unit 184. In various embodiments, the forward path unit 182 comprises a transform unit 186 and a quantization unit 188. In various embodiments, the inverse path unit 184 comprises an inverse quantization unit 190 and an inverse transform unit 192. The inverse transform unit 192 is generally configured to perform an inverse operation relative to the transform unit 186. The operations performed by the individual hardware units implemented in each stage of the circuit 144 generally implement the compressing steps typical of the particular compression scheme(s) to be performed. The stages of the circuit 144 (e.g., stages 162-168) may comprise additional circuitry for operatively coupling the stages to one another. Feedback paths between the stages 162-168 (e.g., represented by dashed arrows) generally facilitate the communication of predictor information that is generally based on actual neighbor data rather than based on estimated neighbor data from later stages to earlier stages of the circuit 144.

Figure 6:
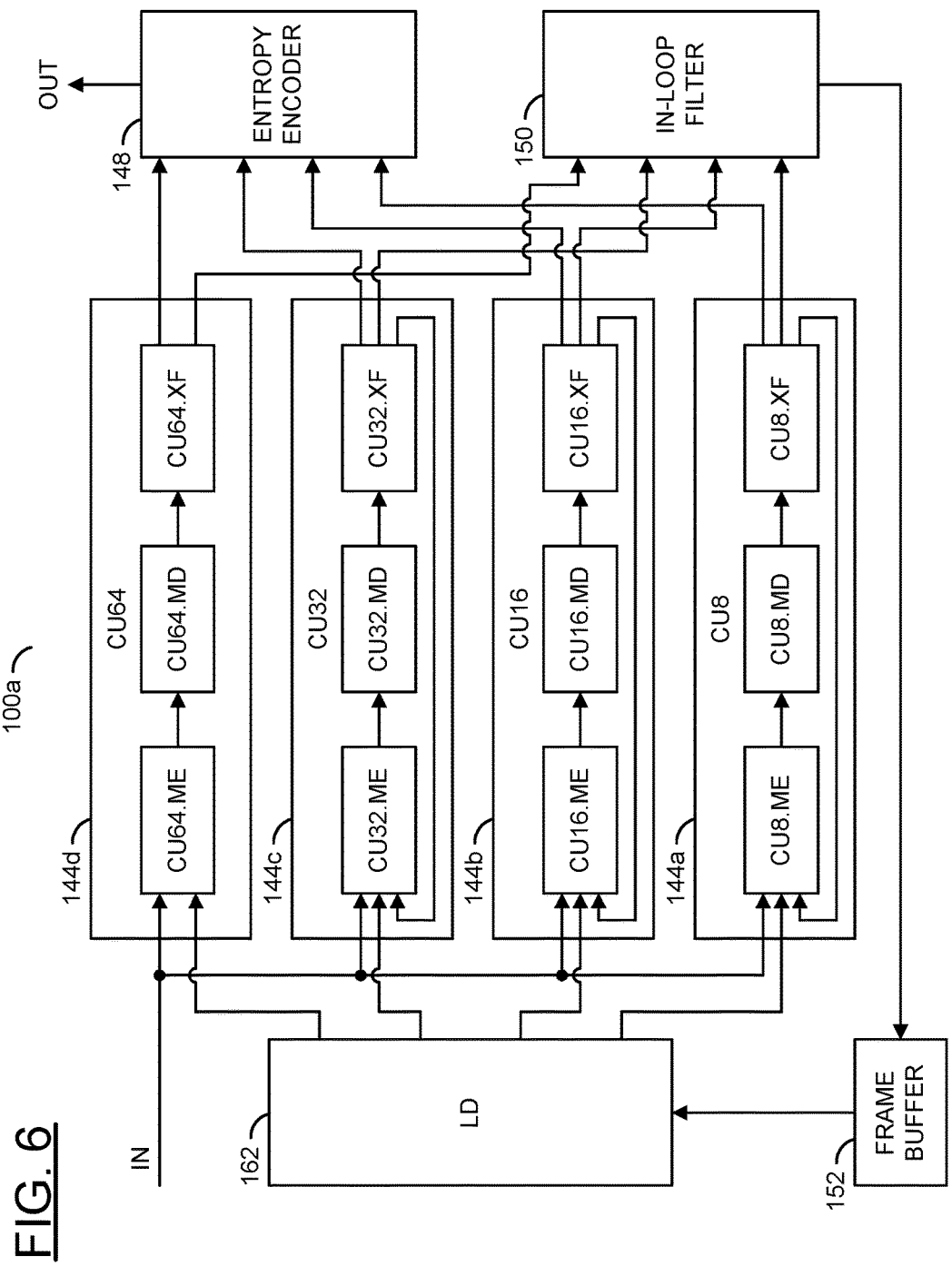
FIG. 6 is a diagram of the circuit with four pipelines.

Referring to FIG. 6, a diagram of an example implementation of a circuit 100a is shown. The circuit 100a may be a variation of the circuit 100. The circuit 100a generally comprises multiple blocks (or circuits) 144a-144d, the circuit 148, the circuit 150, the circuit 152, the load stage 162. Each circuit 144a-144d may be an individual implementation of the circuit 144. The circuits 144a-144d may be implemented in hardware, software, firmware or any combination thereof in an apparatus (or device).

The circuit 100a may be configured to process all coding unit sizes in a quad-tree partitioning (e.g., K=4) of a 64×64 coding tree unit. The four pipelines 144a-144d may be used to process the four respective coding unit sizes (e.g., CU8, CU16, CU32 and CU64) in parallel. All of the circuits 144a-144d may share the load stage 162 (e.g., P=1) and the remaining (e.g., Q=3) stages may be implemented separately for each coding unit size. In some embodiments, the stage ME may be implemented in common with the pipelines 144a-144d. The circuit 152 generally holds the reconstructed images for previously encoded images in a sequence that may be used as reference images in cases of inter prediction. The set of coefficients of a selected coding unit (produced by one of the four pipelines) may be encoded with the circuit 148 to produce the final bitstream in the signal OUT. The reconstructed samples of the selected coding unit (produced by the same pipeline) may also be filtered by the circuit 150 before the samples are written back to the circuit 152.

Figure 7:
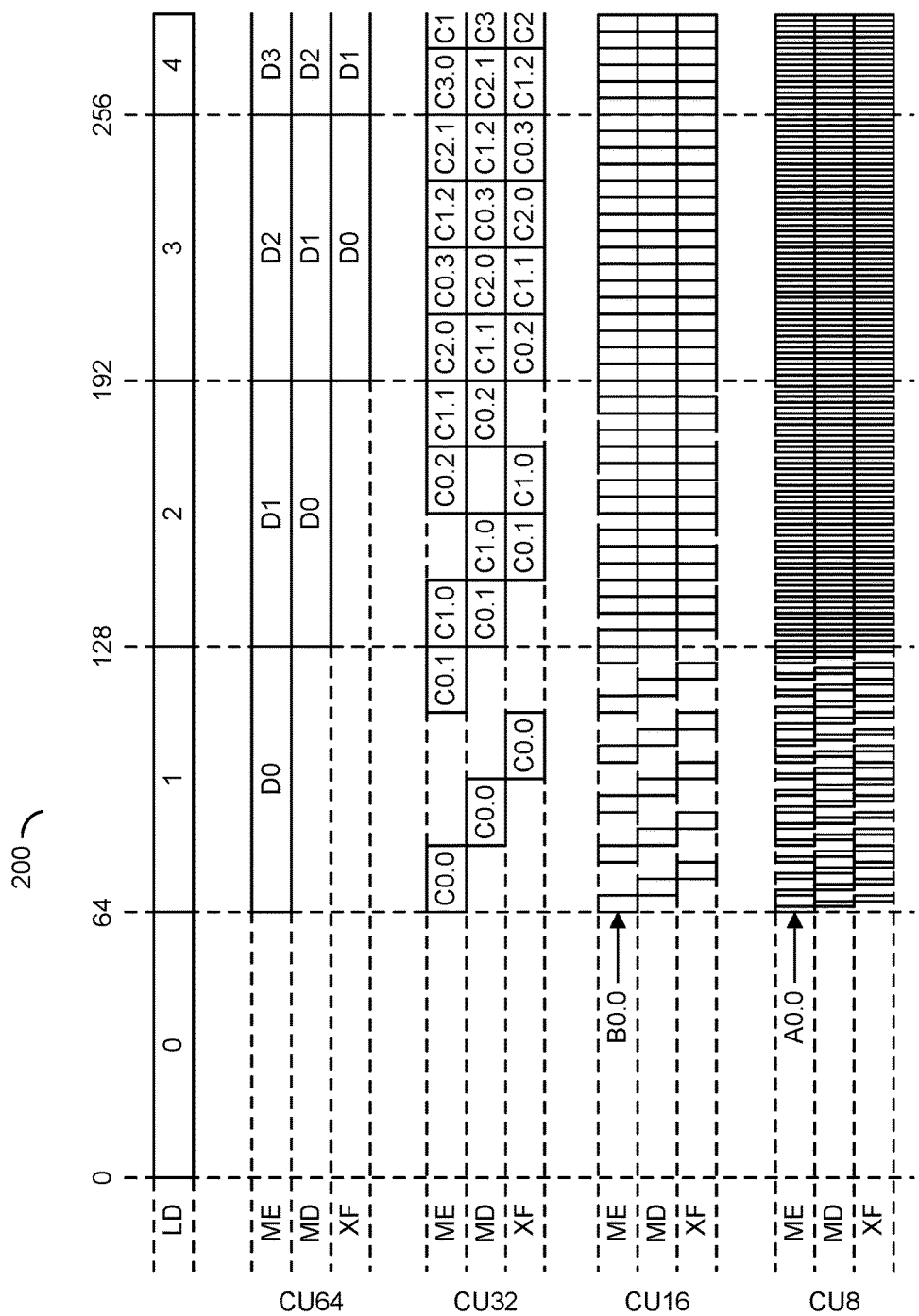
FIG. 7 is a diagram of operations in the four pipelines.

Referring to FIG. 7, a diagram of an example operation 200 of the circuits 144a-144d is shown. The operation 200 processes a coding tree unit of size 64×64. At time 0, an initial coding tree unit (e.g., CTU0) may enter the stage LD (e.g., 162). All reference pixels suitable for processing by the four pipelines 144a-144d may be fetched and stored into a local reference buffer. At time 64, the initial coding three unit CTU0 may enter the stages ME (e.g., 164) of all four pipelines 144a-144d at once.

The circuit 144a (e.g., pipeline CU8) generally operates at 64 times a higher rate than the circuit 144d (e.g., pipeline CU64). The pipeline CU8 generally uses a single time unit to advance a single stage in the pipeline. After three time units, the initial code unit CU8 (e.g., A0.0) has advanced through the stage ME, the stage MD and the stage XF (e.g., 168) of the pipeline CU8, and so a neighboring block (e.g., A0.1) may be started. At time 64+12=76, the first four CU8 blocks (e.g., blocks A0.0-A0.3) may finish being processed.

At the same time, the circuit 144b (e.g., pipeline CU16), which operates at four times a lower rate than the pipeline CU8, has advanced the initial CU16 block (e.g., block B0.0) through the stage ME, the stage MD and the stage XF of the pipeline CU16. At time 64+12=76, a size decision may be made by the circuit 142, and either the CU16 block is quad-partitioned into four CU8 blocks, or the CU16 block is chosen as an intermediate winner. The process is generally repeated for the next four CU16 blocks, and at time 64+48=112, the first four CU16 blocks (B0.0-B0.3) may have been evaluated. Some CU16 blocks may be quad-partitioned down to the CU8 size by using some blocks A.0-A.15.

The circuit 144c (e.g., pipeline CU32) operates at four times a lower rate than the pipeline CU16 (and thus a 16 times lower rate than the pipeline CU8). The initial CU32 block (e.g., block C0.0) generally takes 48 time units to advance through the stage ME, the stage MD and the stage XF of the pipeline CU32. At time 64+48=112, a size decision at the CU32 level may be made, and either the CU32 block is quad-partitioned into four CU16 blocks, or the CU32 block is chosen as the intermediate winner. The process is repeated for the next four CU32 blocks, and at time 64+192=256 all four CU32 blocks (e.g., blocks C0.0-C0.3) of the coding tree unit have been evaluated. Some CU32 blocks may be further quad-partitioned down to the CU16 level or even the CU8 level.

The circuit 144d (e.g., pipeline CU64) generally operates at a lowest rate (4×/16×/64× lower than the pipelines CU32/CU16/CU8 respectively). After 192 time units, the CU64 block (e.g., block D0) may have advanced through the stage ME, the stage MD and the stage XF of the pipeline CU64. At time 64+192=256, a size decision at the CU64 level may be made. Either the CU64 block is quad-partitioned into four CU32 blocks (which could be further quad-partitioned down to CU16 blocks or CU8 blocks or any mix thereof), or the CU64 block D0 is chosen as a final winner for the code tree unit CTU0.

At time 64, a new coding tree unit (e.g., CTU1) from a different tile may enter the stage LD. At time 64+64=128, the coding tree unit CTU1 generally enters the stage ME of all four pipelines. Because the coding tree unit CTU1 belongs to a different tile than the coding tree unit CTU0, no dependencies may exist on the decisions still to be made for the coding tree unit CTU0. Therefore, the four pipelines may process all blocks of the coding tree unit CTU0 and the coding tree unit CTU1 in a tile-interleaved fashion.

At time 128, another coding tree unit (e.g., CTU2) from yet another tile enters the stage LD. At time 192, the coding tree unit CTU2 is injected into the four pipelines for CU8, CU16, CU32 and CU64. At the same time, another coding tree unit (e.g., CTU3) from still another tile may enter the stage LD. Continuing forward, all pipelines may be operating at approximately 100% utilization. At time 256, the initial coding tree unit CT0 may have been completed and all decisions for the coding tree unit CTU0 may have been finalized. At that time, a next coding tree unit (e.g., CTU4) from the initial tile may be started since all conflicts due to dependencies between neighboring blocks have been resolved.

The circuit 100a may efficiently process four coding tree units from four different tiles simultaneously. In a steady state operation, a single coding tree unit of the four tiles may be loaded in the stage 162, while three coding tree units from the three remaining tiles are being processed in the tile-interleaved fashion in the stage ME. The stage MD and the stage XF of the four parallel pipelines CU8-CU64 are generally dedicated to the four supported block sizes. The pipelines CU8-CU64 may be coupled to each other, and size decisions may be made by the circuit 142 at key points between pipelines CU8-CU64 of adjacent block sizes to evaluate all possible quad-tree partitions of the 64×64 coding tree unit.

Hardware tends to be less efficient when operating at higher rates due to a reduced capability of amortizing latency over the duration of a pipeline stage. While the throughput of all four pipelines CU8-CU64 in the circuit 100a are described as being identical, the area tends to be larger for the pipelines that operate on smaller blocks. The area difference may be most noticeable for the pipeline CU8 that has the shortest stage duration.

An efficient implementation may be realized if the throughput for the pipeline operating on the smaller blocks is lower than the pipelines operating on the larger blocks. If the hardware for Z pipelines operating on the largest coding units is made Z times faster, two or more code unit sizes may be combined into a single pipeline that processes all the corresponding coding unit sizes in time-multiplexed fashion.

Figure 8:
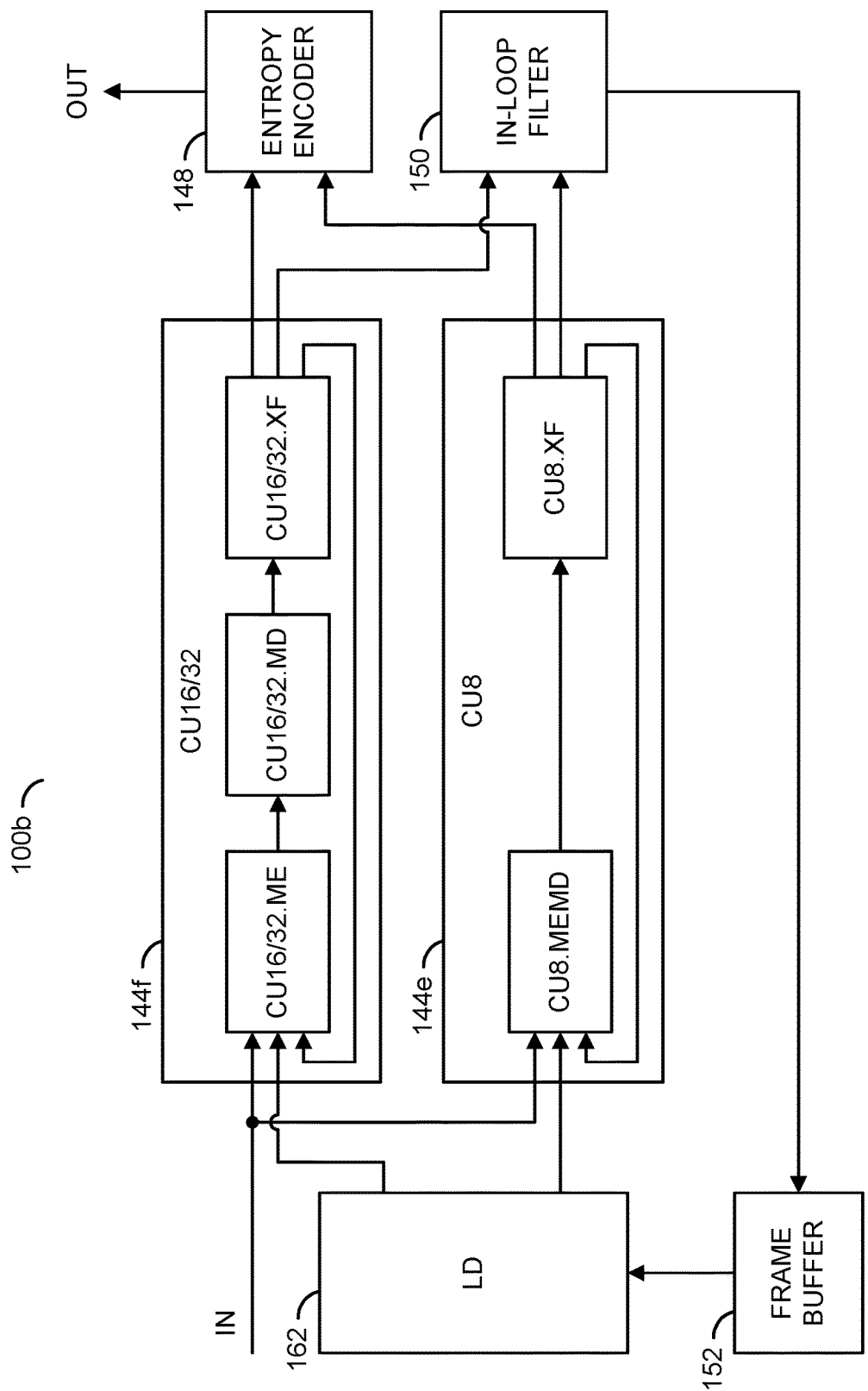
FIG. 8 is a diagram of the circuit with two pipelines.

Referring to FIG. 8, a diagram of an example implementation of a circuit 100b is shown. The circuit 100b may be a variation of the circuits 100 and/or 100a. The circuit 100b generally comprises multiple blocks (or circuits) 144e-144f, the circuit 148, the circuit 150, the circuit 152, the stage 162. Each circuit 144e-144f may be an individual implementation of the circuit 144. The circuits 144e-144f may be implemented in hardware, software, firmware or any combination thereof in an apparatus (or device).

The coding tree unit size in the example is generally limited to at most 32×32 pixels. Conceptually, three pipelines (e.g., CU8, CU16 and CU32) may be implemented, but the hardware designed to process the CU16 blocks and the CU32 blocks may be more efficient than the hardware designed to process the CU8 blocks. Therefore, the pipeline CU16 and the pipeline CU32 of the circuit 100a may be combined into a single pipeline CU16/32 in the circuit 100b, leaving only two pipelines total. The stage 162 is generally shared between the two pipelines. The stage ME and the stage MD of the pipeline CU8 may also be combined into a single stage MEMD. The stage ME of the pipeline CU16/32 may still be separate, but may be faster than the stage MD and the stage XF.

The circuit 100b generally supports three-tile operation (e.g., N=3) with two active tiles (Q=2) in the stages ME/MD/XF of the pipelines, as illustrated. At time 0, an initial 32×32 coding tree unit (e.g., CTU0) may enter the stage LD. After 16 time units, the reference pixels are fetched into the local reference buffer and the coding tree unit CTU0 may enter the stage MEMD of the pipeline CU8 and the stage ME of the pipeline CU16/32 simultaneously.

Figure 9:
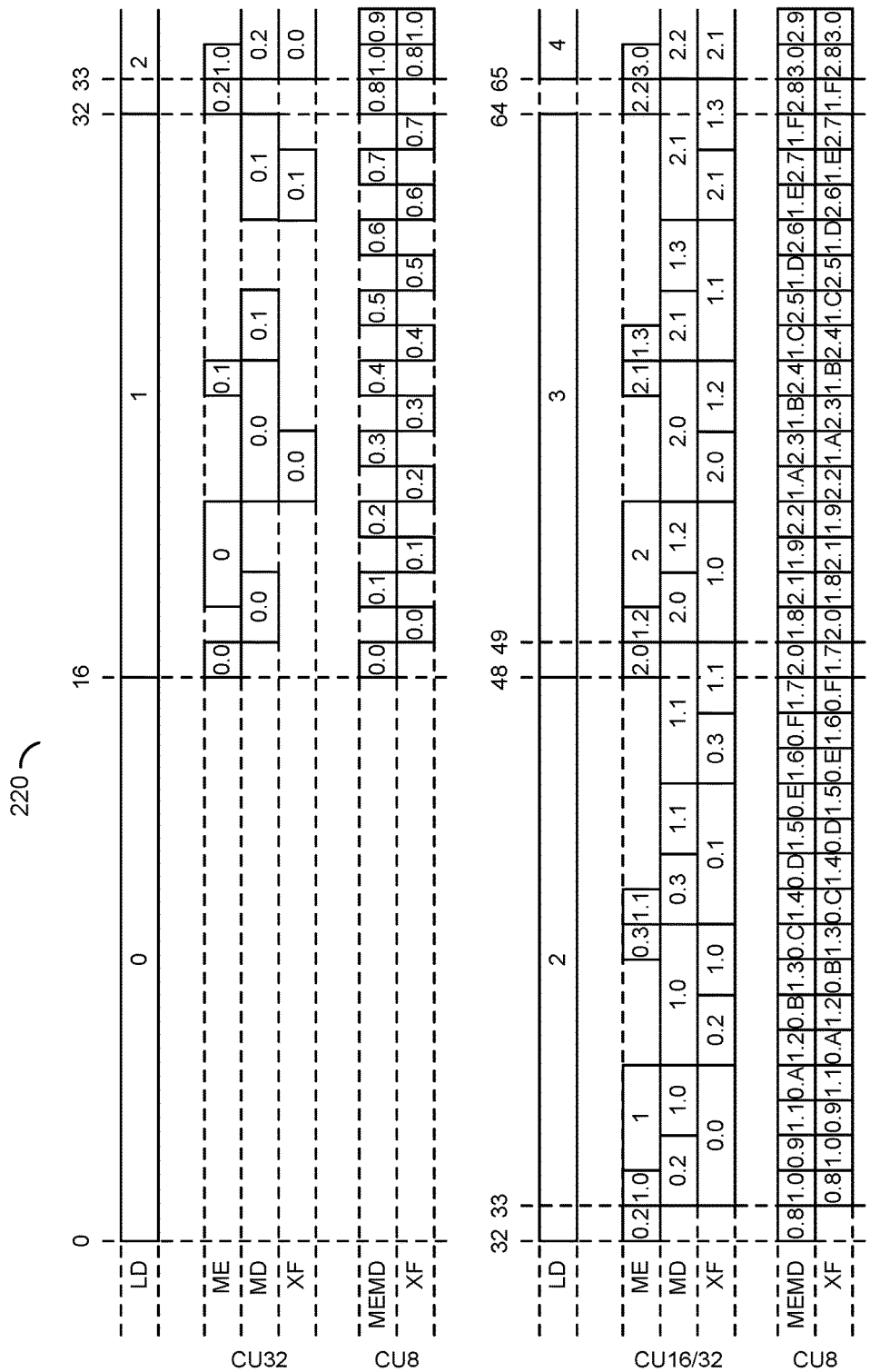
FIG. 9 is a diagram of operations in the two pipelines.

Referring to FIG. 9, a diagram of an example operation 220 of the circuits 144e-144f is shown. The operation 200 processes a coding tree unit of size 32×32. The pipeline CU8 generally advances through the stage MEMD and the stage XF in a single time unit. Therefore, after two time units the initial CU8 block (e.g., block A.0) resides in the stage XF. At that time, a neighboring block A.1 may be started in the stage MEMD of the pipeline CU8. After 8 time units total (e.g., at time 16+8=24), the initial four CU8 blocks may have been evaluated in the pipeline CU8.

The pipeline CU16/32 operates much faster, using only two time units to advance a CU16 block (which is four times larger than a CU8 block) through the stage MD or the stage XF of the pipeline. The pipeline CU16/32 also has a separate stage ME that uses a single time unit to perform the ME operation on a CU16 block. At time 17, an initial CU16 block (e.g., B0.0) finishes the stage ME and enters the stage MD. The mode decision operation is generally completed at time 17+2=19. The transform operation may not be complete until time 24, and so may be started as late as time 22.

The transform operation for block B0.0 may be started at time 21, and finished at time 23. At time 24, when both B0.0 and A0.0-A0.3 have been completed, a size decision is generally made, and either the CU16 block B0.0 is quad-partitioned into A0.0-A0.3 or B0.0 is chosen as the intermediate winner. The processing may repeat at time 24 for the blocks A0.4-A0.7 in the pipeline and the block B0.1 in the pipeline CU16/32. Similar processing may be started at time 32 for blocks A0.8-A0.12 and a block B0.2. Additional processing may be started at time 40 for blocks A0.12-A0.15 and a block B0.3.

Because the pipeline CU16/32 has twice the throughput than the pipeline CU8, plenty of time may be available to process the CU32 block C0 in a time-multiplexed manner. At time 18, the motion estimation operation for the block C0 may be started. At time 21, the block C0 generally enters the stage MD of the pipeline CU16/32. The stage MD may use 8 time units to process a CU32 block fully. However, processing of the CU16 block may have a higher priority, so the mode decision operation is generally interrupted at time 25, and later resumed at time 29. Essentially, the block C0 is split into two sub-blocks C0.0 and C0.1. The sub-block C0.1 may complete the mode decision operation at time 33, and the transform operation for the sub-block C0.0 may be started at the same time. The transform operation for CU32 blocks may also split into two phases of four time units each. At time 45, the block C0 may be fully evaluated. At time 48, a size decision is generally made for the last collocated CU16 block B0.3, after which a size decision for the CU32 block may be made as well: either the coding tree unit CTU0 is implemented as a single coding unit CU32 block C0, or is quad-partitioned into CU16 blocks and/or CU8 blocks.

At time 16 a new coding tree unit (e.g., CTU1) from a second tile may be started in the stage LD. At time 32, the blocks A1.0, B1.0 and C1 may be ready to enter the stage MEMD and the stage ME of the pipeline CU8 and the pipeline CU16/32. Due to the even number of active tiles (Q=2) a conflict may exist for both pipelines, so the initial CU8 block A1.0 may be started in the MEMD stage of the pipeline CU8 at time 33, and the initial CU16 block may enter the stage ME of the pipeline CU16/32 at time 33. Continuing forward, both the pipeline CU8 and the pipeline CU16/32 (with exception of the stage ME) are generally 100% utilized. Full processing of all blocks A1.0-A1.15, B1.0-B1.3 and C1 and to make all size decisions may use 32 cycles, so at time 33+32=65 processing of the coding tree unit CTU1 may be completed.

At time 32, a new coding tree unit (e.g., CTU2) from a third tile may be started in the stage LD. At time 48, another coding tree unit (e.g., CTU3) from the first tile may be started. Normally the second coding tree unit (e.g., CTU4) for the second tile would be started at time 64, but since the neighbor coding three unit CTU1 completes at time 65, the stage LD of the coding tree unit CTU4 may be delayed by a single cycle. The stage LD generally has 15 cycles to complete, so in steady state the stage LD may be 15/16=94% utilized.

Most of the hardware area may be consumed with the stage MEMD and the stage XF of the pipeline CU8, and the stage MD and the stage XF of the pipeline CU16/32. Therefore, the reduced utilization of the stage LD and CU16/32 stage ME is a minor issue outweighed by the increased efficiency of time-multiplexed operation of the pipeline CU16/32 and the reduced number of tiles used to keep the system fully occupied.

Some embodiments of the present invention may provide high performance, high quality tree-coded video compression according to more recent video compression standards, including but not limited to the high-efficiency video coding (e.g., H.265) recommendation. High hardware utilization may be achieved by implementing dedicated pipelines for specific block sizes with an odd number of stages. The parallel pipelines are generally coupled such that collocated blocks start and finish at approximately the same time, allowing intermediate size decisions. By combining the parallel pipelines with time-multiplexed pipelines, the number of active tiles may be reduced without compromising significant hardware efficiency. Both the parallel and time-multiplexed pipelines may operate in tile-interleaved fashion to maximize the utilization. The block encoding within a tile is generally sequential, resulting in the high quality encoding.

The functions performed by the diagrams of FIGS. 1-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a circuit configured to (i) generate a plurality of sets of coefficients by compressing a tile in a picture in a video signal a plurality of times, each time at one of a plurality of different sizes of a plurality of coding units in a coding tree unit and (ii) reconstruct said tile based on a particular one of said sets of coefficients, wherein (a) said sets of coefficients of said tile are generated at two or more of said different sizes of said coding units in parallel, (b) each of said sets of coefficients of said tile is generated in a corresponding one of a plurality of pipelines that operate in parallel and at different clock cycle rates and (c) each of said sets of coefficients of said tile has a same number of said coefficients processed in said pipelines; and
a processor configured to select said particular set of coefficients to reconstruct said tile in response to said compression of said tile.

2. The apparatus according to claim 1, wherein each of said pipelines has a number of unique stages that is prime with respect to a tree branching factor.

3. The apparatus according to claim 1, where said pipelines have a common stage.

4. The apparatus according to claim 3, wherein said circuit is further configured to load a reference picture in parallel from said common stage of said pipelines into separate ones of said pipelines.

5. The apparatus according to claim 1, wherein each one of said pipelines finishes said compression of said tile at said different sizes of said coding units at approximately a same time.

6. The apparatus according to claim 1, wherein a first of said pipelines compresses said tile at said two or more of said different sizes of said coding units in a time multiplexed sequence.

7. The apparatus according to claim 6, wherein said first pipeline finishes said compression of said tile at said two or more different sizes of said coding units and a second of said pipelines finishes said compression of said tile at another of said different sizes of said coding units at approximately a same time.

8. The apparatus according to claim 1, wherein each one of said pipelines interleaves compression of said tile with compression of another tile in said picture.

9. The apparatus according to claim 1, wherein said circuit is further configured to encode said particular set of coefficients to generate an output signal compliant with an International Telecommunication Union-Telecommunications Recommendation H.265.

10. The apparatus according to claim 1, wherein said circuit and said processor form part of a digital camera.

11. A method for tree-coded video compression with coupled pipelines, comprising the steps of:
generating a plurality of sets of coefficients by compressing a tile in a picture in a video signal a plurality of times, each time at one of a plurality of different sizes of a plurality of coding units in a coding tree unit, wherein (a) said sets of coefficients of said tile are generated at two or more of said different sizes of said coding units in parallel, (b) each of said sets of coefficients of said tile is generated in a corresponding one of a plurality of pipelines that operate in parallel and at different clock cycle rates and (c) each of said sets of coefficients of said tile has a same number of said coefficients processed in said pipelines;
selecting a particular one of said sets of coefficients to reconstruct said tile in response to said compression of said tile; and
reconstructing said tile base on said particular set of coefficients.

12. The method according to claim 11, wherein each of said pipelines has a number of unique stages that is prime with respect to a tree branching factor.

13. The method according to claim 11, where said pipelines have a common stage.

14. The method according to claim 13, further comprising the step of:

loading a reference picture in parallel from said common stage of said pipelines into separate ones of said pipelines.

15. The method according to claim 11, wherein each one of said pipelines finishes said compression of said tile at said different sizes of said coding units at approximately a same time.

16. The method according to claim 11, wherein a first of said pipelines compresses said tile at said two or more of said different sizes of said coding units in a time multiplexed sequence.

17. The method according to claim 16, wherein said first pipeline finishes said compression of said tile at said two or more different sizes of said coding units and a second of said pipelines finishes said compression of said tile at another of said different sizes of said coding units at approximately a same time.

18. The method according to claim 11, further comprising the step of:
  interleaving said compression of said tile with compression of another tile in said picture in each one of said pipelines.

19. The method according to claim 11, further comprising the step of:
  encoding said particular set of coefficients to generate an output signal compliant with an International Telecommunication Union-Telecommunications Recommendation H.265.

20. The method according to claim 11, wherein said method is performed in a digital camera.

* * * * *